June 9, 1959 K. J. AVERSTEN 2,890,070
RAIL-BOND SHOE ATTACHABLE BY CONICALLY POINTED BRAZING PIN
Filed Nov. 3, 1954 2 Sheets-Sheet 1
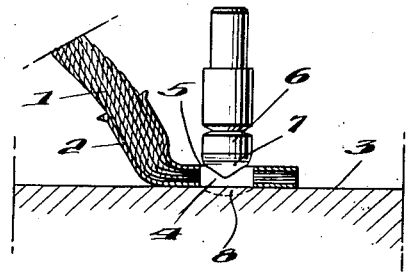
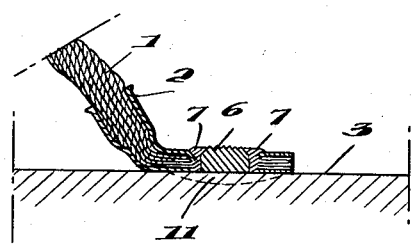
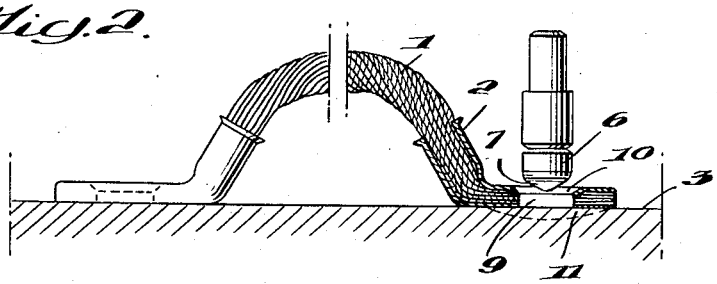
INVENTOR
KARL JOEL AVERSTEN,
BY Robert B Pearson
ATTORNEY June 9, 1959   K. J. AVERSTEN   2,890,070
RAIL-BOND SHOE ATTACHABLE BY CONICALLY POINTED BRAZING PIN
Filed Nov. 3, 1954   2 Sheets-Sheet 2

INVENTOR
KARL JOEL AVERSTEN,

BY Robert B Pearson

ATTORNEY

United States Patent Office 2,890,070
Patented June 9, 1959

2,890,070

RAIL-BOND SHOE ATTACHABLE BY CONICALLY POINTED BRAZING PIN

Karl J. Aversten, Lidingo, Sweden, assignor to Svenska Aktiebolaget Gasaccumulator, Lidingo (near Stockholm), Sweden, a corporation of Sweden Application November 3, 1954, Serial No. 466,569

Claims priority, application Sweden June 16, 1954

1 Claim. (Cl. 287—20.2)

This invention relates to such connection members of metal, especially rail bonds, that are provided with apertures and are intended to be attached to a metal surface by partial melting of the front part of a metal pin in the aperture of the connection member by means of an arc between said part of the pin and the metal surface, this aperture thereby being filled by the pin and melted metal, which metal after solidification brings about a firm joining of the connection member with the metal surface. The diameter of the pin is of about the same size as the diameter of the aperture in the connection member and the pin is before melting inserted into the aperture and against the metal surface and is thereafter pulled out approximately until its point is situated at the outer end of the aperture, in order to obtain a suitable arc length between the point of the pin and the metal surface. However, there is then a considerably shorter free distance between the front end of the pin and the edge of the aperture than said arc length. This often causes the arc to be formed completely or partly between the pin and the edge of the aperture instead of between the pin and the metal surface, with the consequence that said edge is burnt through and consumes energy that would otherwise heat the metal surface at the bottom of the aperture. The consequence is, especially, that consumption of material and energy is higher than should be necessary and the strength of the connection is often impaired and is thus more unreliable than it should be in such connections.

The present invention relates to such an improved execution that the above-mentioned disadvantages are removed. For this purpose the outer part of the aperture of the connection element is widened outwards, preferably in such a way that the inner part of the aperture, which forms about two thirds of the axial depth, is cylindrical and its outer third conical. The invention also refers to a method of manufacturing the connection element and to an apparatus suitable for performing this method.

Figure 4:
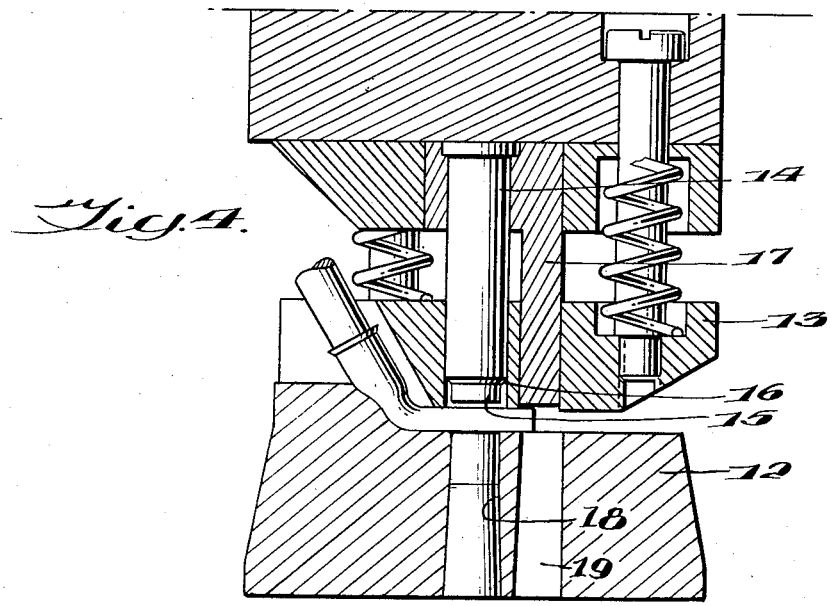
Figure 5:
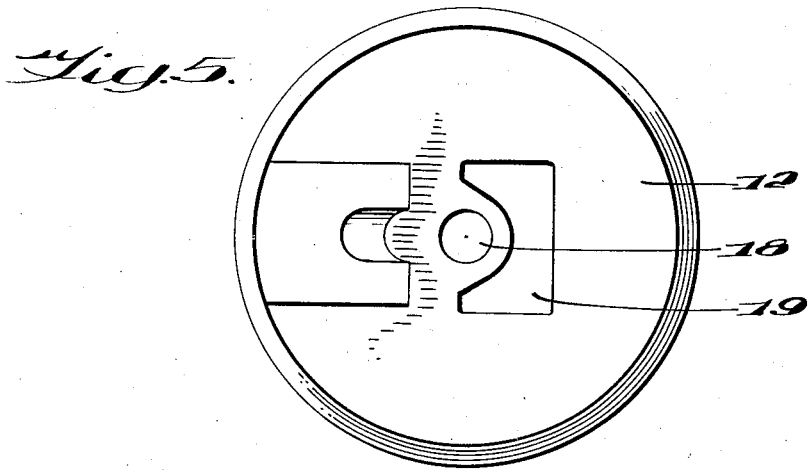

The invention is shown, by way of example, on the attached drawings. Fig. 1 shows a side view, partly in section, of a part of a previously known contact connection just before it is attached to a metal surface. Fig. 2 also shows a side view, partly in section, of a contact connection with a metal surface according to the invention just before the connection is attached to a metal surface. Fig. 3 shows a section of the contact connection of Fig. 2, after it has been attached to the metal surface. Fig. 4 shows a vertical section of an apparatus for forming the contact connection according to the invention. Fig. 5 shows a plan view of the lower die member in Fig. 4.

According to the prior art, as shown in Fig 1, a rail bond consists of an electric cable 1 and two contact shoes, of which only one, 2, is shown. This contact shoe is attached to an even surface 3 of a rail end, only partly indicated. Through the contact shoe 2 there is a cylindrical aperture 4 with an outer sharp edge 5. A metal pin 6 of for instance steel, copper, brass or the like is at its front end provided with a soldering metal 7, such as silver solder, harder silver solder, welding bronze or the like. This pin 6, 7 is inserted into a welding gun (not shown), and is first kept inserted in the aperture 4, preferably with the pointed part 7 against the metal surface 3. While feeding current to the pin 6, 7, this pin is pulled up from the metal surface to strike an arc between the tip of the pin and the metal surface, and as the pin is pulled upwards, the arc is correspondingly lengthened, but when the pin has reached its upper limit, which corresponds to the position shown in Fig. 1, the pin lies considerably closer to the edge of the aperture 5 than to the metal surface 3, so that the arc will now extend largely or entirely to the edge 5, and the heat from the arc will be consumed by burning the edge 5 instead of being supplied to the metal surface 3. This surface therefore gets an unfavorably small heated zone 8, situated inside of the dashed line. The low heating of the zone 8 causes a correspondingly low binding strength between the metal surface and the soldering metal, which is melted down from the part 7 of the pin and accumulates in the aperture 4, where it solidifies after the part 6 of the pin has been pressed down into it. The contact shoe is thereby badly or unreliably fastened to the metal surface.

According to the invention shown in Fig. 2, the contact shoe 2 is provided with an aperture, consisting of an inner, cylindrical part 9, forming about two thirds of the axial depth of the aperture, and an outer conical part 10, which is widened outwards and forms the remaining third of the axial depth of the aperture. In this case the arc, started between the end of the pin and the metal surface, gets no tendency to spark to the contact shoe, and the metal surface 3 receives all of the benefit of the arc, so that a comparatively wide and deep heated zone 11 is obtained.

When the soldering metal 7 has melted and accumulated in the aperture 9, 10, the pin 6 is pressed down against the metal surface, and the melted soldering metal fills up the aperture 9, 10 and forms, when solidifying, a fixed connection there and along the zone 11 of the metal surface 3 and the underside of the contact shoe, as shown in Fig. 3, whereby a very good connection with excellent strength is obtained.

A suitable apparatus for forming the contact connection in the described way consists, according to Figs. 4 and 5, of a lower part 12 for supporting the contact shoe 2 and an upper part 13, which can be raised and lowered in relation to the lower part 12. In the upper part 13 there is an axially restrictedly displaceable punch 14 with a cylindrical part 15 and immediately above this a tapered part 16, the periphery of which preferably tapers at an angle of 45° with respect to the axis of the punch. Beside the punch 14 there is a shearing punch 17, the edge of which runs along a semi-circle. In the lower part 12, which forms a punch pad for cooperation with the punches 14, 17, there are two through passages 18 and 19, respectively, straight under the punches 14, 17.

A contact connection 1 is put with its one, massive shoe 2 as shown in Fig. 4. The punches 14, 17 are driven downwards and the shearing punch 17 cuts clean the outer end of the contact shoe, and the punch part 15 first cuts a cylindrical aperture in the contact shoe and then, while the part 15 is still filling out the inner part of the aperture, the tapered part 16 presses aside the outer edge of the cylindrical aperture, so that a conical depression is formed in the outer end of the contact shoe to provide an aperture of the shape shown in Fig. 2. Thus, the tapered part 16 turns down and compresses the outer wall of the shoe 2, so that a ring-shaped wall strengthening is obtained and the connection member thus gets a valuable increase in its solidity. Hereafter the punches are drawn up, the upper part is raised and the contact connection is turned end-for-end, so that its second contact shoe comes into position on the lower part 12 and the operation is repeated.

The invention has been described for a rail bond but is of course intended to be applied to all kinds of metal members with apertures, meant for connection to a metal object by means of a pin, partly melted in the arc and fixed in the aperture after the solidification of the fuse. The enlargement in the aperture may alternatively be produced in other usual ways of mechanical aperture extension and may extend over a greater or smaller part of the depth of the aperture. The apparatus for the shaping of the aperture may be varied in its details.

What is claimed is:

A rail bond to be secured to a metallic surface by means of a brazing pin having a conically pointed tip of soldering metal through electric arc techniques comprising a stranded conductor and a tubular contact shoe forced on each end of the conductor, the outer axial portion of said shoes and conductor therein being flattened and provided with an aperture straight through, the wall of the tubular shoe adjacent the upper opening of the aperture being depressed and bent over adjacent strand ends and forming a conical portion of the aperture for preventing arcing between the brazing pin and the wall of the aperture and securing reliable heat transfer to the metallic surface, and providing for a conical head of soldering metal on the brazing pin in the finished bond.

References Cited in the file of this patent

UNITED STATES PATENTS

| | | |
|---|---|---|
| 354,412 | Harrington | Dec. 14, 1886 |
| 558,016 | Ford et al. | Apr. 7, 1896 |
| 770,466 | Hupfel | Sept. 20, 1904 |
| 812,900 | Thomas | Feb. 20, 1906 |
| 2,038,210 | Everett | Apr. 21, 1936 |
| 2,711,915 | Aversten | June 28, 1955 |

FOREIGN PATENTS

| | | |
|---|---|---|
| 21,720 | Great Britain | Oct. 2, 1911 |
| 135,952 | Sweden | June 3, 1952 |
| 231,018 | Germany | Feb. 3, 1911 |